United States Patent

[11] 3,570,661

[72] Inventor Cyril Kersh
 Campbell, Calif.
[21] Appl. No. 792,121
[22] Filed Jan. 17, 1969
[45] Patented Mar. 16, 1971
[73] Assignee Memorex Corporation
 Santa Clara, Calif.

[54] ATTACHMENT KNOB ASSEMBLY FOR A DISC PACK BOTTOM COVER
 1 Claim, 2 Drawing Figs.

[52] U.S. Cl. .................................................. 206/62P,
 206/52R, 340/174.1C, 346/137
[51] Int. Cl. .......................................................... G11b 1/02,
 G11b 25/04, B65d 21/02
[50] Field of Search ........................................... 206/62, 52;
 340/174.1; 346/137; 220/97

[56] References Cited
 UNITED STATES PATENTS
 3,509,992 5/1970 David et al. ................... 340/174.1

| | | | |
|---|---|---|---|
| 3,176,281 | 3/1965 | Pattison | 340/174.1 |
| 3,370,698 | 2/1968 | Geier | 206/52 |
| 3,465,875 | 9/1969 | McKelvey, Jr. | 206/62 |

*Primary Examiner*—Bernard Konick
*Assistant Examiner*—Vincent P. Canney
*Attorney*—Limbach, Limbach, and Sutton ABSTRACT: An improved cover set for magnetic memory disc packs in which the attachment mechanism for the bottom cover includes a manipulating handle below the bottom cover having a stem smaller than the handle extending through an aperture in the cover with the stem having on its upper end a threaded portion for threaded attachment to the disc memory, a sleeve mounted above the bottom cover telescopically encircling the stem for preventing withdrawal of the stem through the cover, and a releasable attachment connecting the sleeve and the stem where they telescopically fit together.

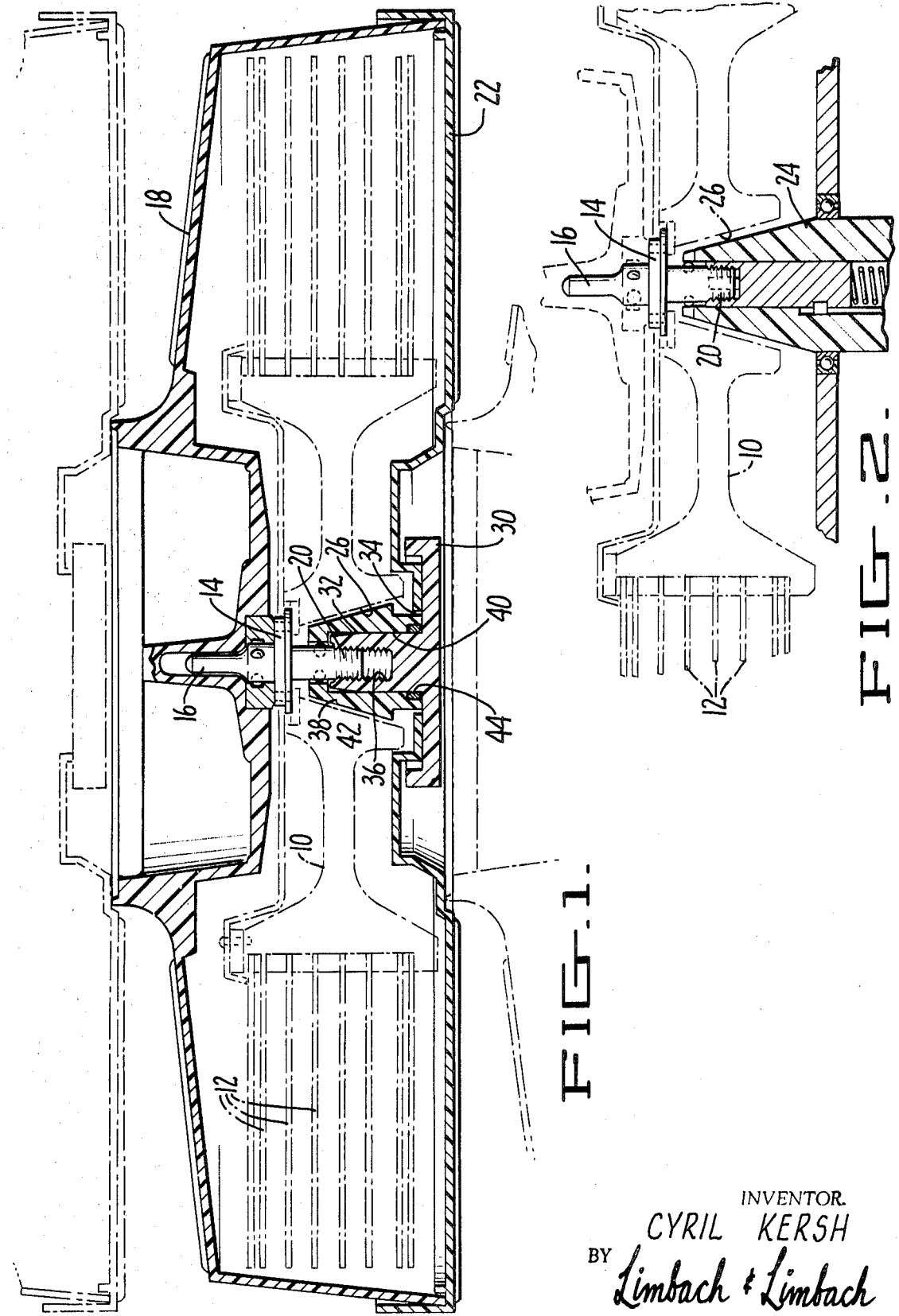
INVENTOR.
CYRIL KERSH
BY Limbach & Limbach
ATTORNEYS

3,570,661

ATTACHMENT KNOB ASSEMBLY FOR A DISC PACK BOTTOM COVER

BACKGROUND OF INVENTION

Disc pack magnetic memories are known in the art as shown in Pattison U.S. Pat. No. 3,176,281 and David et al. U.S. Pat. No. Des. 208,216 in which a plurality of magnetic recording discs are mounted on a hub and enclosed in a cover set which includes a top cover and a bottom cover. A special latching mechanism is provided for attaching the top cover to the disc pack. The bottom cover attaches to the disc pack by threaded engagement with a threaded stem by which the disc pack is attached to a disc drive during use of the disc pack on a computer.

The attachment mechanism for the bottom cover has normally been made by rigidly cementing together two pieces on opposite sides of the bottom cover with one of the pieces extending through a central hole in the bottom cover. The lower of the two pieces may be used for manipulating the attachment mechanism while the upper of the two pieces carries a threaded aperture which is screwed onto the disc pack. It has been necessary to the past that the two pieces of this attachment mechanism be rigidly connected together because, when the bottom cover is screwed onto the disc pack, the threaded engagement between the upper member of the attachment mechanism and the disc pack tends to pull the two members of the attachment mechanism apart.

Because the two parts of the bottom cover attachment mechanism are rigidly connected together, serious difficulties are encountered in servicing disc packs when for some reason the attachment mechanism becomes damaged. Thus, it frequently occurs that the screw threads on the attachment mechanism for the bottom cover becomes stripped requiring the attachment mechanism to be replaced. Because the attachment mechanisms for the bottom covers of disc packs have been made as described above, it has been impractical in the past to effect simple replacement of the attachment mechanism in many situations with the result that the entire bottom cover must be replaced.

It is an object of this invention to provide a new attachment mechanism for the bottom cover of disc packs which can be assembled very easily and which can be disassembled in the field for replacement or repair of the attachment mechanism without replacing the entire disc pack bottom cover.

Other objects and advantages of the invention will become apparent from the following description read in conjunction with the attached drawing in which:

FIG. 1 is a vertical cross-sectional view through a disc pack employing this invention with the FIG. illustrating in phantom outline a pair of adjacent disc packs in a stack of the disc packs; and FIG. 2 is a central sectional view of the disc pack of FIG. 1 illustrating the manner in which the disc pack is mounted on the drive shaft of a disc drive mechanism after removal of the bottom cover.

Referring now in detail to the drawing, the disc pack illustrated therein includes a central hub 10 on which are mounted a plurality of magnetic recording discs 12 and a central latch member 14. The latch member 14 includes an upper latching portion 16 adapted for latching engagement with a top cover 18 and a lower threaded stem 20 which is adapted for attachment to a bottom cover 22 as illustrated in FIG. 1 or alternatively to the drive shaft 24 of a computer as illustrated in FIG. 2. It will be noted that the central hub 10 has a downwardly facing conical seat 26 which is adapted for engagement with the top of drive shaft 24, and when the bottom cover 22 is screwed on to the disc pack to a sufficient extent, this conical seat 26 may engage the top of the bottom cover attachment mechanism described below.

The bottom cover 22 is attached to the disc pack by way of a manually operable knob 30 which has a stem portion 32 thereon extending through a central aperture 34 in the bottom cover 22. The knob and stem may be formed of two pieces cemented together, but are preferably integral. The upper end of the stem portion 32 is provided with a central threaded opening 36 which is adapted to be threaded onto the shaft 20.

Telescopically surrounding the stem 32 is a sleeve member 38 which has an internal surface 40 adjacent to the stem 32 and an external surface 42. A resilient O-ring 44 is mounted in a small annular recess at the base of the sleeve 38 with the O-ring compressed between the sleeve 38 and the stem 32.

The attachment mechanism described above is originally mounted on the bottom cover by inserting the sleeve 38 through the aperture in the bottom cover by inserting the sleeve 38 through the aperture in the bottom cover from the top, placing the O-ring 4 in the annular recess, and then forcing the stem 32 downwardly into the O-ring to the position illustrated in FIG. 1 with the cover turned upside down. It will be noted that the upper portion of the stem 32 is provided with a slight taper to facilitate this assembly. Since both the knob 30 and sleeve 38 have diameters larger than the diameter of the aperture 34, the attachment mechanism assembled as described above is permanently mounted on the bottom cover and not easily lost from the bottom cover. However, when it may be necessary to remove the attachment mechanism for repair, the bottom cover may be removed from the disc pack and turned upside down from the position illustrated in FIG. 1, and the sleeve 38 may be removed from the stem 32 simply by pulling upwardly on the knob 30. In this regard, it should be noted that the threaded attachment for connecting the bottom cover to the disc pack must be provided on the stem 32 instead of the sleeve 38 so that when the bottom cover is attached to the disc pack no force is applied to the sleeve 38 tending to pull it off of the stem 32.

I claim:

1. In a disc pack having a memory structure including a central hub with an upwardly facing latch portion and a downwardly facing threaded portion surrounded by a downwardly facing conical seat, a plurality of memory discs rigidly secured to said hub, a top cover releasably attached to said latch portion and extending outwardly therefrom and hence downwardly around said memory structure, and a bottom cover releasably attached to said threaded portion and extending therefrom into engagement with said top cover, the improved bottom cover which comprises:

A generally circular panel adapted to cover the bottom of said memory structure with said panel having a central aperture therein;

A knob member having a manipulating portion which is larger than said aperture and located below said panel and a stem portion integrally formed with said manipulating portion and extending upwardly herefrom through said aperture with said stem portion having a threaded surface near its upper end for releasable threaded engagement with said threaded portion of said memory structure;

A sleeve which is larger than said aperture located above said panel with said sleeve having an interior bore telescopically encircling said stem and an exterior upwardly facing surface; and Releasable attaching means releasably securing said stem to said sleeve.